US011933766B2

(12) United States Patent
Badeau et al.

(10) Patent No.: US 11,933,766 B2
(45) Date of Patent: Mar. 19, 2024

(54) MATERIAL PROFILING FOR IMPROVED SIZING ACCURACY (71) Applicant: Evident Canada, Inc., Québec (CA)

(72) Inventors: Nicolas Badeau, Quebec (CA); Benoit Lepage, L'Ancienne-Lorette (CA)

(73) Assignee: Evident Canada, Inc., Québec (CA)

( * ) Notice: Subject to any disclaimer, the term of this patent is extended or adjusted under 35 U.S.C. 154(b) by 131 days.

(21) Appl. No.: 17/647,490

(22) Filed: Jan. 10, 2022

(65) Prior Publication Data
US 2022/0252551 A1    Aug. 11, 2022

Related U.S. Application Data (60) Provisional application No. 63/178,694, filed on Apr. 23, 2021, provisional application No. 63/146,030, filed on Feb. 5, 2021.

(51) Int. Cl.
G01N 29/26    (2006.01)
G01N 29/06    (2006.01)
(Continued)

(52) U.S. Cl.
CPC ......... *G01N 29/262* (2013.01); *G01N 29/069* (2013.01); *G01N 29/221* (2013.01);
(Continued)

(58) Field of Classification Search
CPC .. G01N 29/262; G01N 29/069; G01N 29/221; G01N 29/265; G01N 29/043;
(Continued)

(56) References Cited

U.S. PATENT DOCUMENTS 5,448,915 A * 9/1995 Dunn .................. G01B 17/025
73/615
5,577,088 A  11/1996 Senevat et al.
(Continued)

FOREIGN PATENT DOCUMENTS

WO   WO-2022165592 A1   8/2022

OTHER PUBLICATIONS

"International Application Serial No. PCT/CA2022/050150, International Search Report dated Apr. 11, 2022", 3 pgs.
(Continued)

*Primary Examiner* — Tarun Sinha
(74) *Attorney, Agent, or Firm* — Schwegman Lundberg & Woessner, P.A.

(57) ABSTRACT

A material profile can be determined by assuming an elliptical or circular arc geometry and by using acoustic noise generated by diffuse internal reflection and/or specular reflection on the internal (ID) or external (OD) interface of the material under inspection, such as a pipe or curved plate. A non-destructive testing (NDT) technique can acquire acoustic data of the material using an ultrasonic signal. The acquired acoustic data can be filtered such that the acoustic noise generated by diffuse internal reflection and/or specular reflection is separated from any flaws in the material. Positions of the acoustic noise can be determined and then a regression technique can be applied to the positions, which can generate an equation of a circle, for example, such as to provide a radius and thickness of the pipe or curved plate.

19 Claims, 5 Drawing Sheets (51) Int. Cl.
*G01N 29/22* (2006.01)
*G01N 29/265* (2006.01)
*G01N 29/04* (2006.01)

(52) U.S. Cl.
CPC ......... *G01N 29/265* (2013.01); *G01N 29/043* (2013.01); *G01N 2291/044* (2013.01); *G01N 2291/267* (2013.01)

(58) Field of Classification Search
CPC ....... G01N 2291/044; G01N 2291/267; G01N 29/0645; G01N 29/2406; G01N 29/28; G01N 29/449; G01N 29/2437; G01N 2291/0258; G01N 2291/106; G01N 2291/2634
See application file for complete search history.

(56) References Cited

U.S. PATENT DOCUMENTS

| | | | |
|---|---|---|---|
| 8,365,602 B2 | 2/2013 | Imbert et al. | |
| 2014/0330127 A1 | 11/2014 | Robert et al. | |
| 2015/0177194 A1* | 6/2015 | Xu | B25J 9/1669 73/641 |
| 2016/0186559 A1* | 6/2016 | Wang | E21B 49/10 702/6 |
| 2020/0018594 A1* | 1/2020 | Zhang | G01S 15/88 |

OTHER PUBLICATIONS

"International Application Serial No. PCT/CA2022/050150, Written Opinion dated Apr. 11, 2022", 6 pgs.

* cited by examiner

MATERIAL PROFILING FOR IMPROVED SIZING ACCURACY

CLAIM OF PRIORITY

This application claims the benefit of priority of U.S. Provisional Patent Application Ser. No. 63/146,030, titled "MATERIAL PROFILING FOR IMPROVED SIZING ACCURACY" to Nicolas Badeau et al., filed on Feb. 5, 2021, and the benefit of priority of U.S. Provisional Patent Application Ser. No. 63/178,694, titled "MATERIAL PROFILING FOR IMPROVED SIZING ACCURACY" to Nicolas Badeau et al., filed on Apr. 23, 2021 the entire contents of each being incorporated herein by reference.

FIELD OF THE DISCLOSURE

This document pertains generally, but not by way of limitation, to non-destructive testing and inspection devices (NDT/NDI).

BACKGROUND

Welding is a long-practiced process for joining separate metal objects together for the purpose of building support structures and producing pipes, vessels, and other products. There are many types of welding techniques including gas welding, electric arc welding and electric resistance welding (ERW).

Inspection of weld integrity has long been recognized as crucially important because it enables the detection of cracking, porosity, incomplete penetration, inclusions, lack of sidewall fusion, and other flaws that can compromise weld strength. Many existing NDT/NDI products are available for ERW weld inspection, such as ultrasonic and eddy current instruments and probes.

During a maintenance procedure, a pipe, for example, can be inspected. The pipe, which can be decades old, can be excavated and inspected. Due to its age and any corrosion, the wall thickness of the pipe is not known precisely a priori. The inspection can determine differences in a thickness of a pipe wall along a length of the pipe. In addition, the thickness along the circumference of the pipe can vary. Precise knowledge of the pipe thickness at the location where ultrasonic inspection is conducted can be an important parameter for accurate inspection and flaw sizing.

SUMMARY OF THE DISCLOSURE

This disclosure describes for determining a material profile, e.g., of a pipe, by assuming an elliptical or circular arc geometry and by using acoustic noise generated by diffuse internal reflection and/or specular reflection on the internal (ID) or external (OD) interface of the material under inspection, such as a pipe or curved plate. A non-destructive testing (NDT) technique can acquire acoustic data of the material using an ultrasonic signal. The acoustic noise generated by diffuse internal reflection and/or specular reflection can be separated from any flaws in the material. Positions of the acoustic noise can be determined and then a regression technique can be applied to the positions, which can generate an equation of a circle, for example, such as to provide a radius and thickness of the pipe.

In some aspects, this disclosure is directed to a method of estimating a profile of an inner surface of a material using a non-destructive testing (NDT) technique, the method comprising: acquiring an acoustic data signal of the material using an ultrasonic signal generated by an ultrasonic probe assembly using the NDT technique; determining a plurality of positions of acoustic noise data in the acoustic data signal, the acoustic noise data generated by diffuse internal reflection; determining an internal surface dimension of the material from a result of a regression technique applied to the plurality of positions; and determining the profile of the material from the internal surface dimension.

In some aspects, this disclosure is directed to an ultrasound inspection system for estimating a profile of an inner surface of a material using a non-destructive testing (NDT) technique, the system comprising: an ultrasonic probe assembly; and a processor configured to: acquire an acoustic data signal of the material using an ultrasonic signal generated by the NDT technique; determine a plurality of positions of acoustic noise data in the acoustic data signal, the acoustic noise data generated by diffuse internal reflection; determine an internal surface dimension of the material from a result of a regression technique applied to the plurality of positions; and determine the profile of the material from the internal surface dimension.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

In order to get accurate measurements during weld inspection of axial welds of tubes, pipes, or curved plates (such as of a tank wall), including but not limited to electric resistance welds (ERW) and submerged arc welds (SAW), various profile parameters, including an inner diameter (ID) radius, an outer diameter (OD) radius, and a thickness, should be known with precision at a location of a flaw. However, these profile parameters can change along the scan axis due to manufacturing tolerances or possible internal/external corrosion, which can affect the accuracy of the weld inspection measurements. The present inventors have recognized a need to improve the estimation of material profile parameters in order to improve sizing measurement during weld inspection.

The present inventors have recognized that a material, e.g., pipe, profile can be determined by assuming an elliptical or circular arc geometry and by using acoustic noise generated by diffuse internal reflection and/or specular reflection on the internal (ID) or external (OD) interface of the material under inspection, such as a pipe or curved plate. As described in detail below, a non-destructive testing (NDT) technique can acquire acoustic data of the material using an ultrasonic signal. The acoustic noise generated by diffuse internal reflection and/or specular reflection can be separated from any flaws in the material. Positions of the acoustic noise can be determined and then a regression technique can be applied to the positions, which can generate an equation of a circle, for example, such as to provide a radius and thickness of the pipe.

The techniques described in this disclosure can be applied to any angle beam shear wave ultrasonic inspection that relies on a reflection from a surface within the component under inspection. In addition, these techniques can compensate for inaccuracies in the shear wave velocity setting of the instrument. Shear wave velocity is not easily obtained because shear wave couplant and a specialized shear wave probe are needed to obtain accurate readings on the actual parts.

Figure 1:
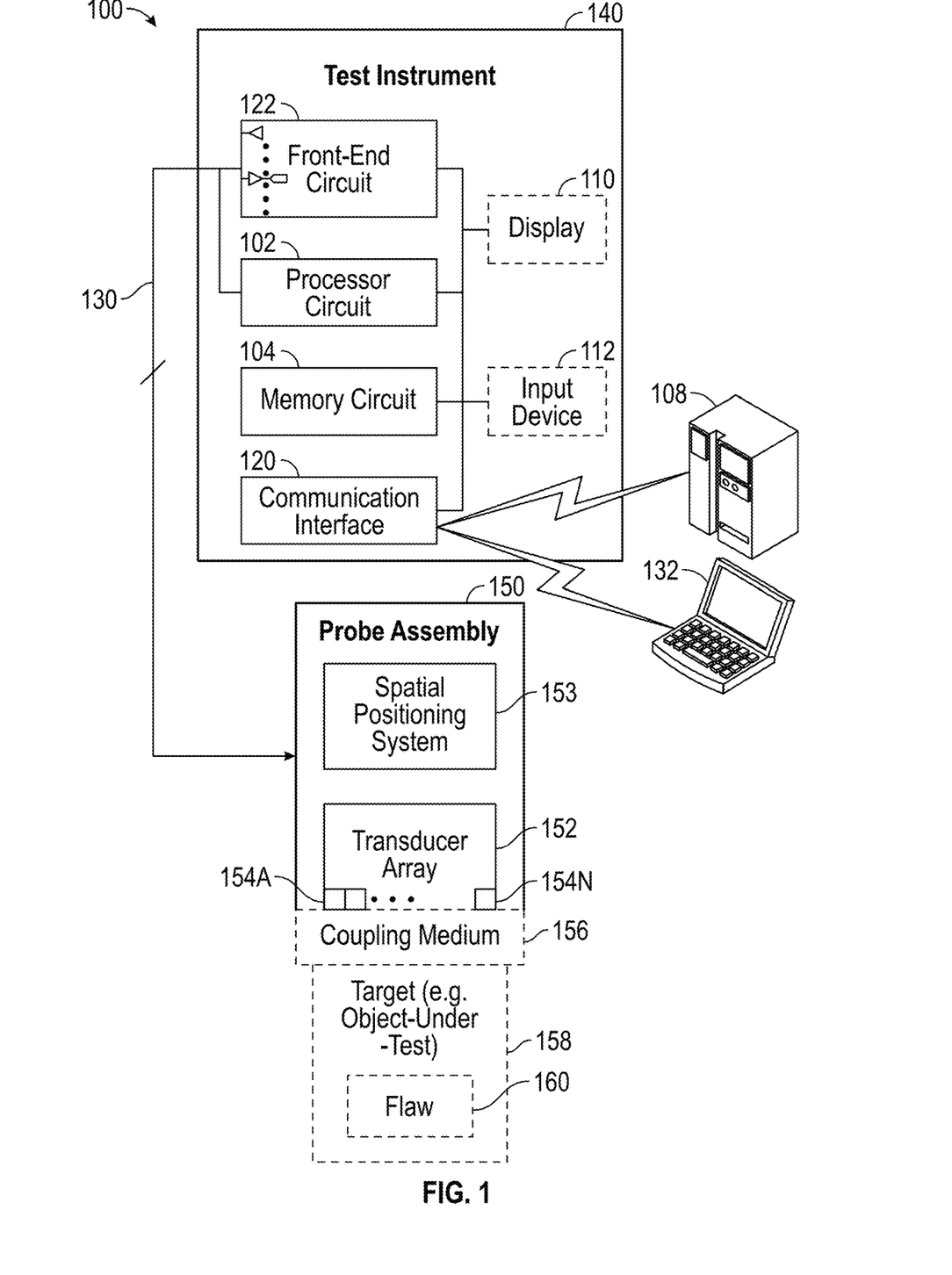
FIG. 1 illustrates generally an example of an acoustic inspection system, such as can be used to perform one or more techniques described herein.

FIG. 1 illustrates generally an example of an acoustic inspection system 100, such as can be used to perform one or more techniques described herein. The acoustic inspection system 100 can perform ultrasonic NDT techniques. The acoustic inspection system 100 of FIG. 1 is an example of an acoustic imaging modality, such as an acoustic phased array system, that can implement various techniques of this disclosure.

The inspection system 100 can include a test instrument 140, such as a hand-held or portable assembly. The test instrument 140 can be electrically coupled to a probe assembly, such as using a multi-conductor interconnect 130. The electrical coupling can be a wired connection or a wireless connection. The probe assembly 150 can include one or more electroacoustic transducers, such as a transducer array 152 including respective transducers 154A through 154N. The transducers array can follow a linear or curved contour or can include an array of elements extending in two axes, such as providing a matrix of transducer elements. The elements need not be square in footprint or arranged along a straight-line axis. Element size and pitch can be varied according to the inspection application.

In some examples, the probe assembly 150 can include a spatial positioning system 153, e.g., an encoder or device to implement encoder-like functions. The spatial positioning system 153, such as a Mini-Wheel™ encoder available from Olympus (https://www.olympus-ims.com/en/scanners/mini-wheel/), can trigger acquisition of the acoustic imaging data every acquisition step, e.g., about 1 mm as a non-limiting example, which can result in consistent data acquisition.

A modular probe assembly 150 configuration can be used, such as to allow a test instrument 140 to be used with various probe assemblies 150. In a non-limiting example, the transducer array 152 can include piezoelectric transducers, such as can be acoustically coupled to a target 158 (e.g., an object under test) through a coupling medium 156. In other examples, capacitive micromachined ultrasonic transducer (CMUT) arrays can be used. The coupling medium can include a fluid or gel or a solid membrane (e.g., an elastomer or other polymer material), or a combination of fluid, gel, or solid structures. The wedge structures can include a rigid thermoset polymer having known acoustic propagation characteristics (for example, Rexolite® available from C-Lec Plastics Inc.), and water can be injected between the wedge and the structure under test as a coupling medium 156 during testing.

The test instrument 140 can include digital and analog circuitry, such as a front-end circuit 122 including one or more transmit signal chains, receive signal chains, or switching circuitry (e.g., transmit/receive switching circuitry). The transmit signal chain can include amplifier and filter circuitry, such as to provide transmit pulses for delivery through an interconnect 130 to a probe assembly 150 for insonification of the target 158, such as to image or otherwise detect a flaw 160 on or within the target 158 structure by receiving scattered or reflected acoustic energy elicited in response to the insonification.

Although FIG. 1 shows a single probe assembly 150 and a single transducer array 152, other configurations can be used, such as multiple probe assemblies connected to a single test instrument 140, or multiple transducer arrays 152 used with a single or multiple probe assemblies 150 for tandem inspection. Similarly, a test protocol can be performed using coordination between multiple test instruments 140, such as in response to an overall test scheme established from a master test instrument 140, or established by another remote system such as a computing facility 108 or general purpose computing device such as a laptop 132, tablet, smart-phone, desktop computer, or the like. The test scheme may be established according to a published standard or regulatory requirement and may be performed upon initial fabrication or on a recurring basis for ongoing surveillance, as illustrative examples.

The receive signal chain of the front-end circuit 122 can include one or more filters or amplifier circuits, along with an analog-to-digital conversion facility, such as to digitize echo signals received using the probe assembly 150. Digitization can be performed coherently, such as to provide multiple channels of digitized data aligned or referenced to each other in time or phase. The front-end circuit 122 can be coupled to and controlled by one or more processor circuits, such as a processor circuit 102 included as a portion of the test instrument 140. The processor circuit 102 can be coupled to a memory circuit, such as to execute instructions that cause the test instrument 140 to perform one or more of acoustic transmission, acoustic acquisition, processing, or storage of data relating to an acoustic inspection, or to otherwise perform techniques as shown and described herein. The test instrument 140 can be communicatively coupled to other portions of the system 100, such as using a wired or wireless communication interface 120.

For example, performance of one or more techniques as shown and described herein can be accomplished on-board the test instrument 140 or using other processing or storage facilities such as using a computing facility 108 or a general-purpose computing device such as a laptop 132, tablet, smart-phone, desktop computer, or the like. For example, processing tasks that would be undesirably slow if performed on-board the test instrument 140 or beyond the capabilities of the test instrument 140 can be performed remotely (e.g., on a separate system), such as in response to a request from the test instrument 140. Similarly, storage of data or intermediate data such as A-line matrices of time-series data can be accomplished using remote facilities communicatively coupled to the test instrument 140. The test instrument can include a display 110, such as for presentation of configuration information or results, and an input device 112 such as including one or more of a keyboard, trackball, function keys or soft keys, mouseinterface, touch-screen, stylus, or the like, for receiving operator commands, configuration information, or responses to queries.

The acoustic inspection system 100 can acquire acoustic data, such as using phased array, FMC, half matrix capture (HMC), virtual source aperture (VSA), or plane wave imaging, of a material using an acoustic acquisition technique, such as an acoustic phased array system. The processor circuit 102 can then generate an acoustic data set, such as a scattering matrix (S-matrix), plane wave matrix, or other matrix or data set, corresponding to an acoustic propagation mode, such as pulse echo direct (TT), self-tandem (TT-T), and/or pulse echo with skip (TT-TT).

To generate an image, an acoustic inspection system, such as the acoustic inspection system 100 of FIG. 1, can use inspection parameters and generation parameters. Inspection parameters need to be known, such as by being input by an operator before a scan begins, without regards to the final acoustic image to be generated. Inspection parameters can include the following: A-scan start (time at the first sample data), sample time resolution, frequency of probe, number of element in probe, and other characteristic of the probe such as element size, pitch, and bandwidth of the probe.

Generation parameters and many inspection parameters are used to generate an acoustic image from the acoustic data. Generation parameters can include selected acoustic mode, nominal thickness of part, velocity (velocity of different mode in the inspection (wedge, part), and a region of interest, (size, position, and/or resolution). An acoustic image, such as a TFM image, can be generated using at least one generation parameter and first acoustic data, such as FMC data, where the first acoustic data can be acquired at least in part by an acoustic acquisition technique, such as an acoustic phased array system.

In accordance with this disclosure, the system 100 of FIG. 1 can implement various techniques, including a method of estimating a profile of an inner surface of a material, such as a metal pipe or curved plate, using a non-destructive testing (NDT) technique. The "inner" surface of the material can refer to a surface opposite to the surface that contacts the wedge of the probe assembly. For example, the system 100 can determine a profile by assuming an elliptical or circular arc geometry and by using acoustic noise generated by diffuse internal reflection on the internal (ID) or external (OD) interface of the material under inspection.

The probe assembly 150 can apply an ultrasonic signal to the material under test, such as a metal pipe or curved plate, generated by an NDT technique, such as an ultrasonic NDT technique. For example, the transducer array 152 of FIG. 1 can apply an ultrasonic signal to the material under test 158. In some examples, the probe assembly can be a single linear array. In response, a processor, such as the processor 102 of FIG. 1, can acquire, using the transducer array 152, an acoustic data signal of the material using the ultrasonic signal. The acoustic data signal can include data from potential flaws in the material as well as acoustic noise data generated by diffuse internal reflection and/or specular reflection as a result of imperfections and/or corrosion on the inner surface of the material, where the "inner" surface of the material can refer to a surface opposite to the surface that contacts the wedge of the probe assembly. In some examples, the specular reflection of the ultrasound on the inner surface cannot be captured by the probe assembly so that only diffuse noise from the inner reflection is available.

In some examples, the processor can gate or bound the acoustic data signal around an estimated thickness of the material, such as a nominal wall thickness of the material and a nominal diameter of the material. As a non-limiting example for purposes of explanation only, a pipe or curved plate can have a nominal wall thickness of 6.5 millimeters (mm), with a tolerance or variation of +/−0.5 mm. The processor can determine a plurality of positions of acoustic noise data in the acoustic data signal between 6.0-7.0 mm.

In addition, in determining the profile, the processor can define a surface profile of the material. The profile can be assumed to have an elliptical or circular arc geometry. That is, the ID and the OD are assumed to be elliptical or circular, which can simplify how the processor computes the profile of the material.

The processor can determine a plurality of positions, e.g., peak positions, of the acoustic noise data, such as by comparing the amplitudes of the acoustic noise data. In some examples, the processor can determine the peaks using a finite impulse response (FIR) filter, such as when using a 1-dimensional signal, e.g., A-scan signal, or using a convolution filter for 2-dimensional images. In some examples, the processor can compare the peaks to a threshold such as a threshold determined using a noise level of the total image. In other examples, a comparator can be sufficient to determine the peaks instead of an FIR filter.

The processor can apply a regression technique to the plurality of positions of the acoustic noise data. As a non-limiting example, the regression technique can include a random sample consensus (RANSAC) algorithm. As mentioned above, the processor can define a surface profile of the material, and the RANSAC algorithm can be used to fit the determined plurality of positions of the acoustic noise data to the surface profile, such as an ellipse or circle, which the processor can use to determine an internal surface dimension of the material. The processor can determine all the peaks above a given threshold (no matter the source of the signal), as mentioned above, and find the best fit for a curve representative of the expected backwall shape, such as using the RANSAC algorithm.

Using the RANSAC algorithm, for example, the processor does not need to separate data from flaws and noise from the back wall. Rather, the principle is that there are more peaks related to the back wall than information related to flaws so the best fit of the RANSAC algorithm should be the back wall signal. In some examples, it can be desirable to combine many inspection positions in determining the back wall position to avoid the risk associated with a high quantity of flaws at one position.

The RANSAC algorithm is less dependent on outlier data points, such as flaw data points, than other regression techniques. The regression technique, such as the RANSAC algorithm, can compute the best regression by removing the outliers, such as by filtering out flaw-related outliers. As a result, the regression technique can extract noise peaks around the nominal wall thickness. As an example, the output of the RANSAC algorithm can be a polynomial equation of an ellipse or circle, which can be used to determine a profile of the pipe or curved plate, including the major and minor axes (or radius) and wall thickness.

The processor can use the nominal wall thickness, the diameter of the pipe or curved plate, and the polynomial equation of an ellipse or circle generated using the RANSAC algorithm applied to the plurality of positions of the acoustic noise data to determine an internal surface dimension of the material. For example, the processor can determine an internal surface radius of the pipe.

In order to the determine the thickness of the material, e.g., the wall thickness of the pipe or curved plate, the processor can use the nominal OD of the pipe or curved plate, define the OD profile as elliptical or circular, determine the wall thickness from a difference between the internal surface radius and the external surface radius (half the nominal OD).

In this manner, the processor can accurately determine a profile of the material, e.g., ID radius, OD radius, and/or thickness, at the flaw location. Without an accurate profile of the material, a flaw in the material could be erroneously determined to be in the middle of the wall thickness when it is actually positioned closer to the inner surface or the outer surface, for example. Knowing the position of a flaw within the thickness of the material can help determine the type of flaw, such as cracking, porosity, incomplete penetration, inclusions, lack of sidewall fusion, and other flaws that can compromise weld strength. In addition, knowing the position of a flaw can impact the sizing of the flaw. For example, in some techniques, such as tip diffraction-based sizing, the flaw sizing is directly correlated to the position of the flaw.

Once the profile of the material is accurately determined using the various techniques described above, the processor can adjust an internal reflection position based on the determined profile. For example, for phase array ultrasonic testing (PAUT), overlays and readings are important tools for an operator during analysis. When the processor adjusts the internal reflection position, the overlay used to show the position of the acoustic reflection is modified in the display. In addition, the processor can update some or all of the readings, e.g., a depth position of a cursor, in relation to the measured thickness.

Figure 2:
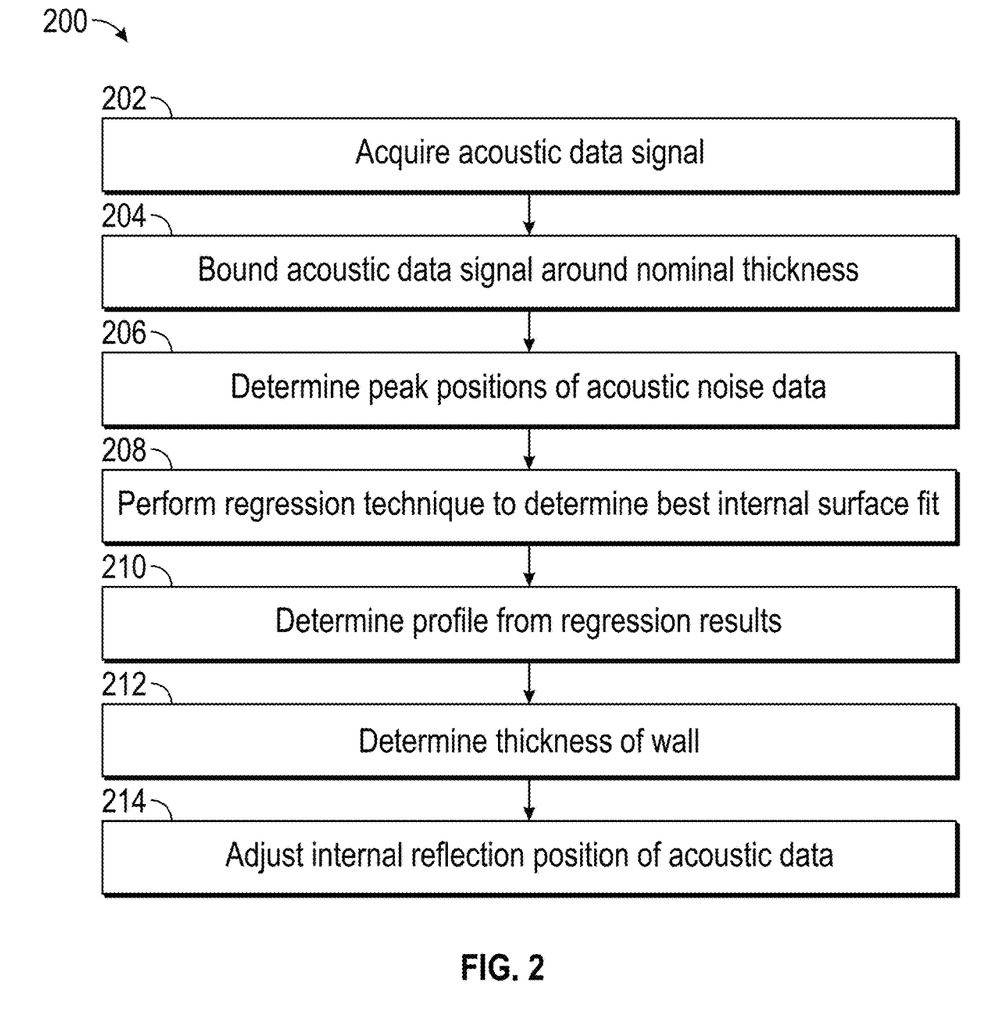
FIG. 2 is a flow diagram depicting an example of a method of estimating a profile of an inner surface of a material using a non-destructive testing (NDT) technique, in accordance with this disclosure.

FIG. 2 is a flow diagram depicting an example of a method of estimating a profile of an inner surface of a material using a non-destructive testing (NDT) technique, in accordance with this disclosure. The flow diagram of FIG. 2 will be describe using FIGS. 3A-3E.

Figure 3A:
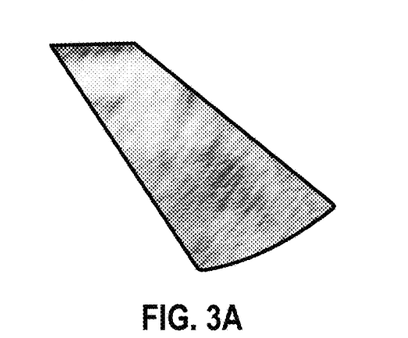
FIG. 3A-3E graphically illustrate portions of the method of FIG. 2 using various non-limiting examples of images generated from acoustic data signals.

At block 202, a processor, such as the processor 102 of FIG. 1, can acquire, using the transducer array 152, an acoustic data signal of the material using the ultrasonic signal. FIG. 3A depicts an example of an image of a material, such as a metal pipe or curved plate, generated using an acquired acoustic data signal.

Figure 3B:
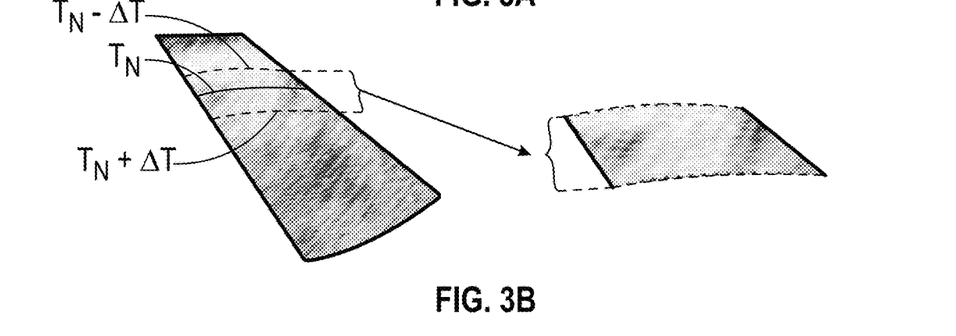

At block 204, the processor can optionally bound the acoustic data signal around an estimated thickness of the material, such a nominal wall thickness of the material and/or a diameter of the material. As seen in FIG. 3B, a nominal thickness $T_N$ can be defined and the nominal thickness $T_N$ can be bounded by an upper limit of $(T_N - \Delta T_N)$ and a lower limit of $(T_N - \Delta T_N)$, where $\Delta T_N$ is the tolerance of the thickness.

Figure 3C:
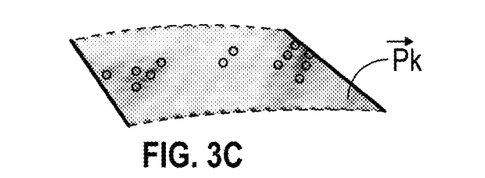

At block 206, the processor can determine a plurality of peak positions of the acoustic noise data, such as by comparing the amplitudes of the acoustic noise data. Acoustic noise data and flaw data is shown in FIG. 3C. An example of a plurality of peak positions $\vec{Pk}$ is also shown in FIG. 3C. In some examples, the processor can determine the peaks using a finite impulse response (FIR) filter, such as when using a 1-dimensional signal, e.g., A-scan signal, or using a convolution filter for 2-dimensional images. In some examples, the processor can compare the peaks to a threshold, such as a threshold determined using a noise level of the total image. In some examples, a comparator can be used instead of an FIR filter.

Figure 3D:
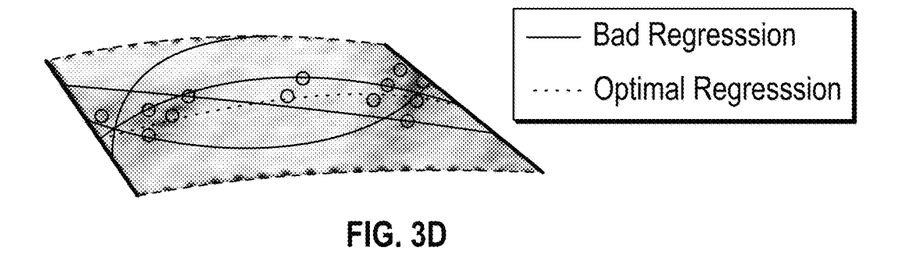

At block 208, the processor can determine a regression technique, such as a RANSAC algorithm, to the plurality of positions of the acoustic noise data to determine the best fit to the surface profile, e.g., determine the best internal surface fit to a pipe or curved plate. In FIG. 3D, various regressions are shown, including bad regressions and an optimal regression of the plurality of peak positions, with flaw data determined to be outliers.

At block 210, the processor can determine a profile from the regression results. For example, the processor can determine an internal surface dimension of the material, such as an internal surface radius of the pipe or curved plate.

At block 212, the processor can determine a thickness of the wall, where the thickness equals half the OD minus the internal surface radius of the pipe or curved plate.

In some examples, it can be desirable to combine multiple inspection positions to provide more robust internal surface dimension estimates. In some such examples, the processor can, at a plurality of inspection positions, repeat the processes described in blocks 202-212, thereby determining a plurality of thicknesses, for example, that correspond to the plurality of inspection positions. In some examples, the processor can then use the determined profiles of the material corresponding to the plurality of inspection positions to determine a combined thickness of the material, such as by determining a central tendency, e.g., average, mean, median, mode, of the determined profiles of the material. In some examples, assuming that the thickness does not change quickly between inspection positions, the processor can apply low pass filtering techniques when comparing the profiles of different scan position to determine a combined internal surface dimension.

Figure 3E:
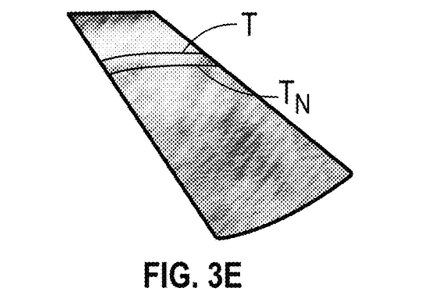

At block 214, the processor can adjust an internal reflection position based on the determined profile. FIG. 3E depicts the determined thickness T adjusted from the nominal thickness $T_N$.

FIG. 3A-3E graphically illustrate portions of the method of FIG. 2 using various non-limiting examples of images generated from acoustic data signals. FIGS. 3A-3E were described above in conjunction with FIG. 2.

Figure 4:
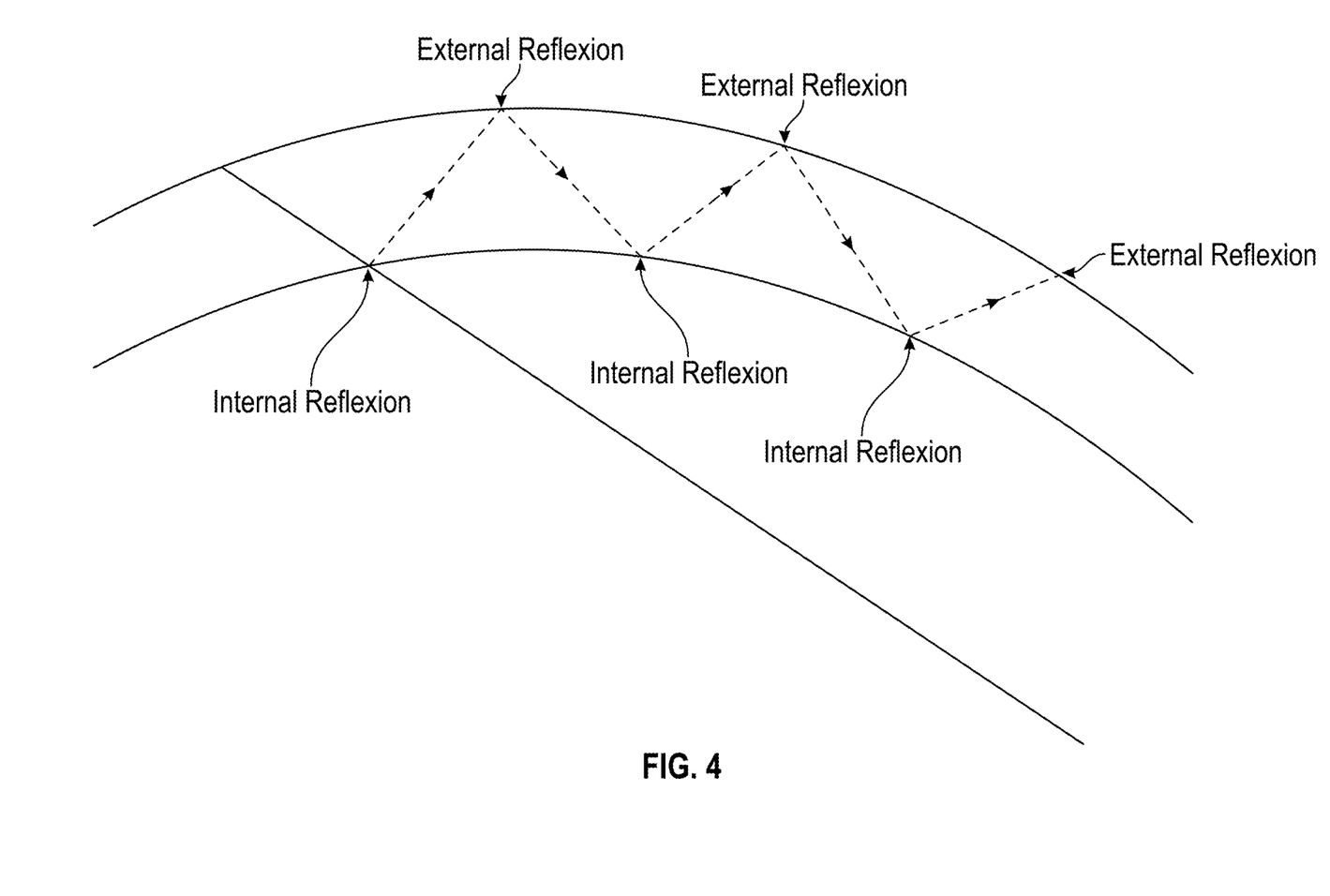
FIG. 4 is a conceptual drawing of the inner and outer surfaces of a material and multiple surface reflections of each.

FIG. 4 is a conceptual drawing of the inner and outer surfaces of a material and multiple surface reflections of each. As shown in FIG. 4, an acoustic inspection system, such as the acoustic inspection system 100 of FIG. 1, can generate multiple internal surface reflections and multiple external surface reflections when applied to the material under test, such as a pipe or curved plate. The multiple internal surface reflections and multiple external surface reflections are shown in the examples of FIGS. 5 and 6.

Figure 5:
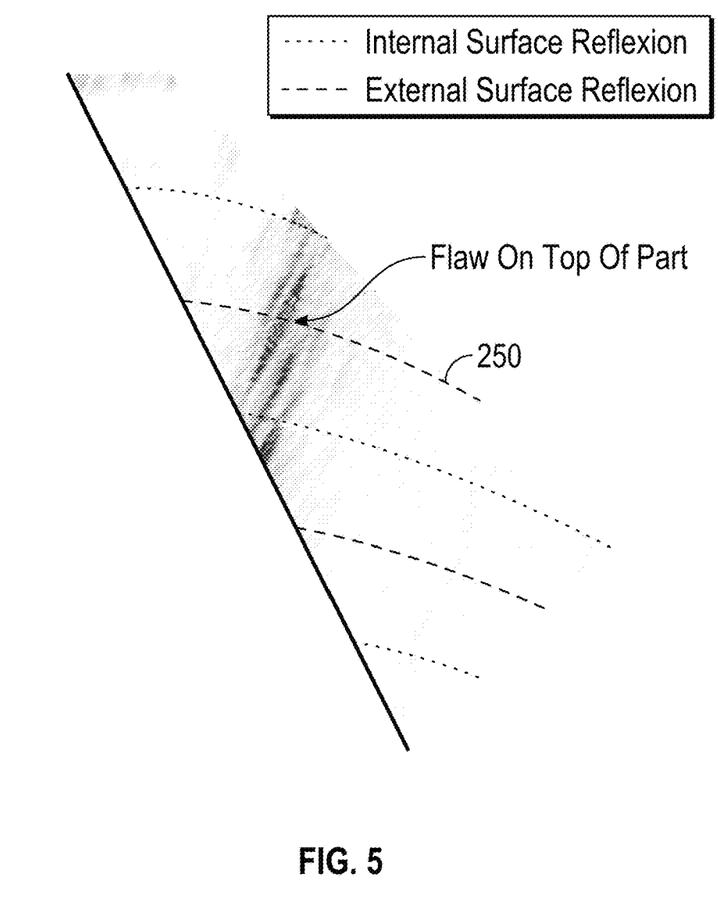
FIG. 5 depicts an example of a flaw detected without using the techniques of this disclosure.

FIG. 5 depicts an example of a flaw detected without using the techniques of this disclosure. In the example shown in FIG. 5, the nominal thickness is 7.5 mm. The flaw is shown at the external surface reflection 250.

Figure 6:
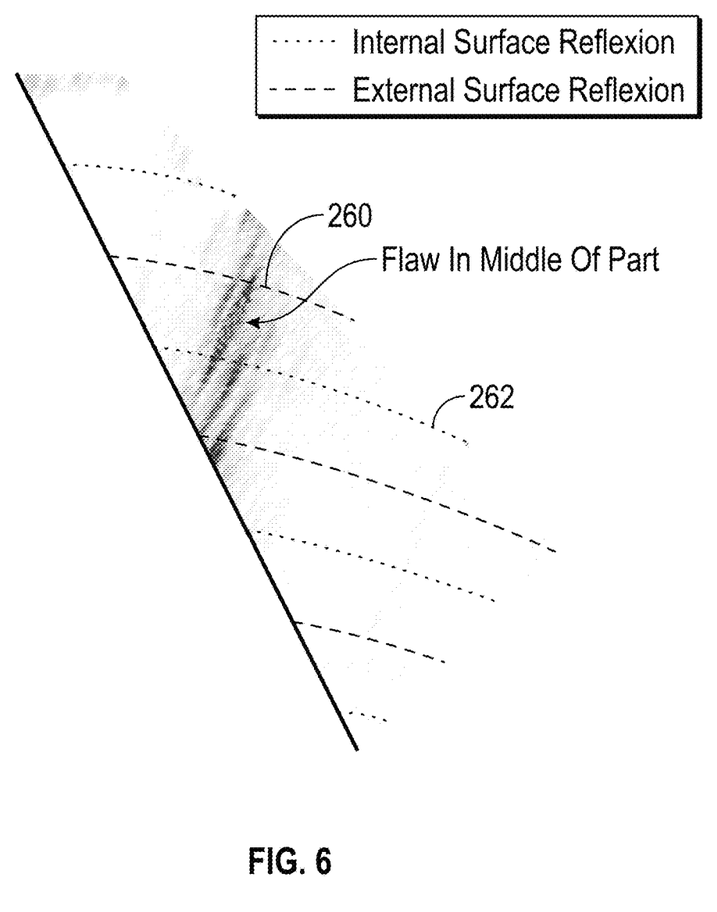
FIG. 6 depicts an example of a flaw detected using various techniques of this disclosure.

FIG. 6 depicts an example of a flaw detected using various techniques of this disclosure. In the example shown in FIG. 6, the true thickness was determined to be 6.1 mm, using various techniques describe above. The flaw is shown between the external surface reflection 260 and the internal surface reflection 262, which indicates that the flaw is near the middle of the material under test and not at the surface, as was predicted in FIG. 5. Thus, by using the techniques of this disclosure, the position of the flaw can be accurately determined.

VARIOUS NOTES

Each of the non-limiting aspects or examples described herein may stand on its own, or may be combined in various permutations or combinations with one or more of the other examples.

The above detailed description includes references to the accompanying drawings, which form a part of the detailed description. The drawings show, by way of illustration, specific embodiments in which the invention may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following aspects, the terms "including" and "comprising" are open-ended, that is, a system, device, article, composition, formulation, or process that includes elements in addition to those listed after such a term in a aspect are still deemed to fall within the scope of that aspect. Moreover, in the following aspects, the terms "first," "second," and "third," etc. are used merely as labels, and are not intended to impose numerical requirements on their objects.

Method examples described herein may be machine or computer-implemented at least in part. Some examples may include a computer-readable medium or machine-readable medium encoded with instructions operable to configure an electronic device to perform methods as described in the above examples. An implementation of such methods may include code, such as microcode, assembly language code, a higher-level language code, or the like. Such code may include computer readable instructions for performing various methods. The code may form portions of computer program products. Further, in an example, the code may be tangibly stored on one or more volatile, non-transitory, or non-volatile tangible computer-readable media, such as during execution or at other times. Examples of these tangible computer-readable media may include, but are not limited to, hard disks, removable magnetic disks, removable optical disks (e.g., compact discs and digital video discs), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the aspects. Also, in the above Detailed Description, various features may be grouped together to streamline the disclosure. This should not be interpreted as intending that an unclaimed disclosed feature is essential to any aspect. Rather, inventive subject matter may lie in less than all features of a particular disclosed embodiment. Thus, the following aspects are hereby incorporated into the Detailed Description as examples or embodiments, with each aspect standing on its own as a separate embodiment, and it is contemplated that such embodiments may be combined with each other in various combinations or permutations. The scope of the invention should be determined with reference to the appended aspects, along with the full scope of equivalents to which such aspects are entitled.

What is claimed is:

1. A method of estimating a profile of an inner surface of a material using a non-destructive testing (NDT) technique, the method comprising:
    acquiring an acoustic data signal of the material using an ultrasonic signal generated by an ultrasonic probe assembly using the NDT technique;
    determining a plurality of positions of acoustic noise data in the acoustic data signal, the acoustic noise data generated by diffuse internal reflection;
    determining an internal surface dimension of the material from a result of a regression technique applied to the plurality of positions; and
    determining the profile of the material from the internal surface dimension.

2. The method of claim 1, comprising:
    adjusting an internal reflection position based on the determined profile.

3. The method of claim 1, comprising:
    bounding the acoustic data signal around an estimated thickness of the material,
    wherein determining the plurality of positions of the acoustic noise data in the acoustic data signal includes:
        determining the plurality of positions of acoustic noise data in the bounded acoustic data signal.

4. The method of claim 1, wherein the material is a metal pipe, and wherein determining the internal surface dimension of the material from the result of the regression technique applied to the plurality of positions includes:
    determining an internal surface radius of the metal pipe.

5. The method of claim 1, wherein the regression technique includes a random sample consensus (RANSAC) algorithm.

6. The method of claim 1, comprising:
    defining a surface profile of the material.

7. The method of claim 6, wherein the surface profile includes an ellipse or circle.

8. The method of claim 6, wherein determining the internal surface dimension of the material from the result of the regression technique applied to the plurality of positions includes:
    fitting the plurality of positions to the defined surface profile.

9. The method of claim 1, wherein the acoustic noise data is generated by the diffuse internal reflection and specular reflection.

10. The method of claim 1, wherein acquiring the acoustic data signal of the material using the ultrasonic signal generated by the ultrasonic probe assembly using the NDT technique includes:
    acquiring an acoustic noise signal generated only by diffused internal reflection on an internal interface or external interface of the material.

11. The method of claim 1, comprising:
    at a plurality of inspection positions, repeating acquiring the acoustic data signal, the determining the plurality of positions of acoustic noise data in the acoustic data signal, the determining the internal surface dimension, and the determining the profile of the material; and determining, using the determined profiles of the material corresponding to the plurality of inspection positions, a combined internal surface dimension.

12. An ultrasound inspection system for estimating a profile of an inner surface of a material using a non-destructive testing (NDT) technique, the system comprising:
    an ultrasonic probe assembly; and
    a processor configured to:
        acquire an acoustic data signal of the material using an ultrasonic signal generated by the NDT technique;
        determine a plurality of positions of acoustic noise data in the acoustic data signal, the acoustic noise data generated by diffuse internal reflection;
        determine an internal surface dimension of the material from a result of a regression technique applied to the plurality of positions; and
        determine the profile of the material from the internal surface dimension.

13. The system of claim 12, wherein the processor is configured to:
    adjust an internal reflection position based on the determined profile.

14. The system of claim 12, wherein the processor is configured to:
    bound the acoustic data signal around an estimated thickness of the material,
    wherein the processor configured to determine the plurality of positions of the acoustic noise data in the acoustic data signal is configured:
    determine the plurality of positions of acoustic noise data in the bounded acoustic data signal.

15. The system of claim 12, wherein the material is a metal pipe, and wherein the processor configured to determine the internal surface dimension of the material from the result of the regression technique applied to the plurality of positions is configured to:
    determine an internal surface radius of the metal pipe.

16. The system of claim 12, wherein the regression technique includes a random sample consensus (RANSAC) algorithm.

17. The system of claim 12, wherein the processor is configured to:
    define a surface profile of the material.

18. The system of claim 17, wherein the surface profile includes a circle.

19. The system of claim 17, wherein the processor configured to determine the internal surface dimension of the material from the result of the regression technique applied to the plurality of positions is configured to:
    fit the plurality of positions to the defined surface profile.

* * * * *